United States Patent [19]

Yamauchi et al.

[11] 4,409,526
[45] Oct. 11, 1983

[54] BRUSHLESS DC MOTOR

[75] Inventors: Hiroyuki Yamauchi, Saitama; Tamotsu Yamagami, Kanagawa, both of Japan

[73] Assignee: Sony Corporation, Tokyo, Japan

[21] Appl. No.: 209,145

[22] Filed: Nov. 21, 1980

[30] Foreign Application Priority Data

Nov. 22, 1979 [JP] Japan ................................ 54-151433

[51] Int. Cl.³ .......................................... H02K 29/00
[52] U.S. Cl. ..................................... 318/254; 318/138
[58] Field of Search ..................... 318/138, 254 A, 254

[56] References Cited

U.S. PATENT DOCUMENTS 3,383,574  5/1968  Manteuffel ...................... 318/254 A
3,517,289  6/1970  Brunner et al. ................. 318/254 A
4,135,120  1/1979  Hoshimi et al. ..................... 318/138

*Primary Examiner*—J. V. Truhe
*Assistant Examiner*—Saul M. Bergmann
*Attorney, Agent, or Firm*—Lewis H. Eslinger; Alvin Sinderbrank

[57] ABSTRACT

A brushless DC motor having a rotor magnet magnetized to provide a sinusoidal magnetic field and two-phase stator windings at positions which differ from each other by an electrical angle which is an odd multiple of 90° is provided with a drive circuit comprising a signal generator with an output having a frequency determined by the rotational speed of the rotor, and a memory having stored therein digital information data converted from sampled values of a sinusoidal signal free of distortion. The digital information data stored in the memory is read out therefrom by the output of the signal generator in synchronism with the magnetic field from the rotor magnet, and such read-out information data is employed to determine currents flowing through the stator windings so that torque ripple is substantially eliminated.

29 Claims, 28 Drawing Figures

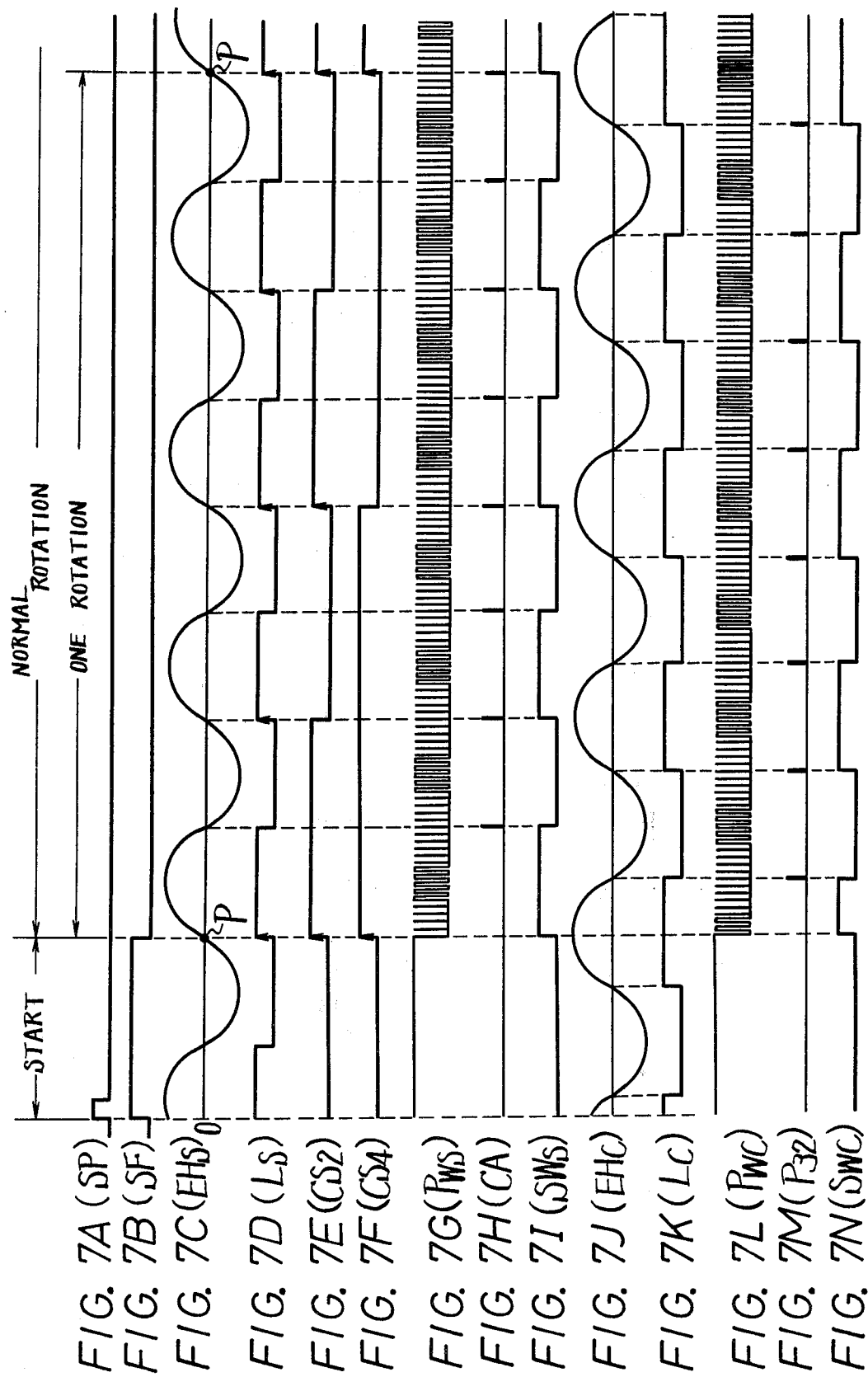

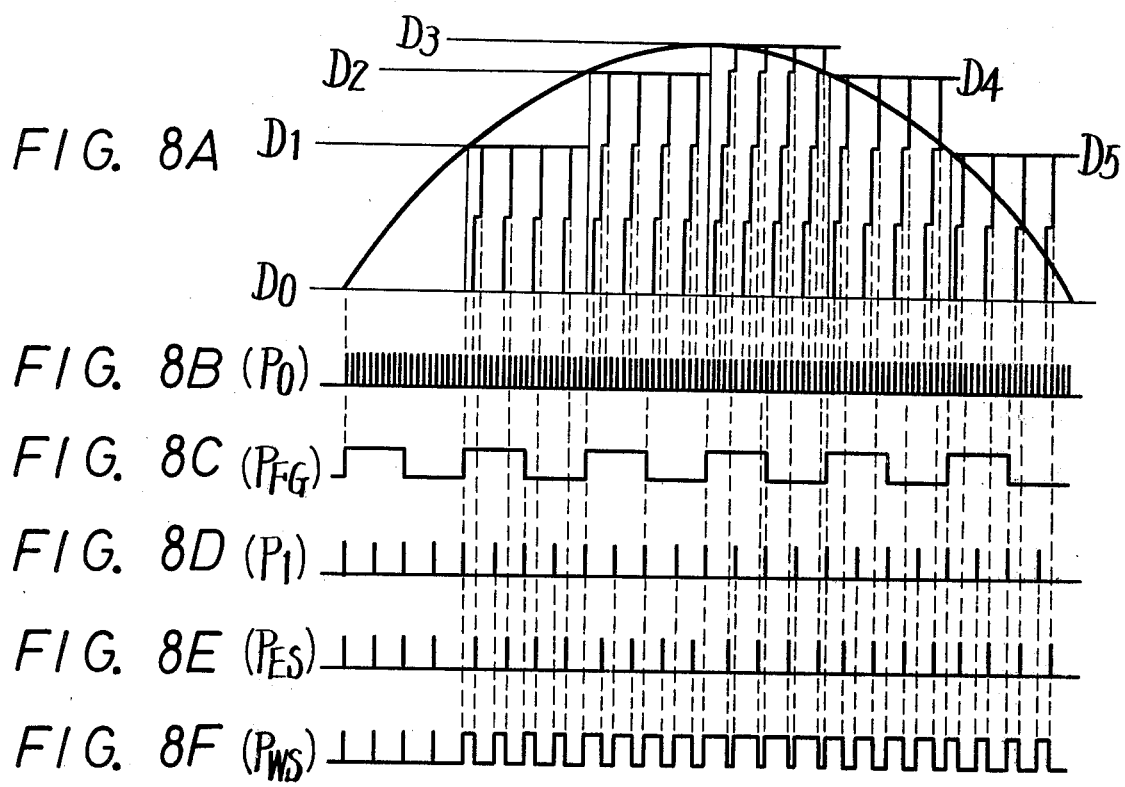
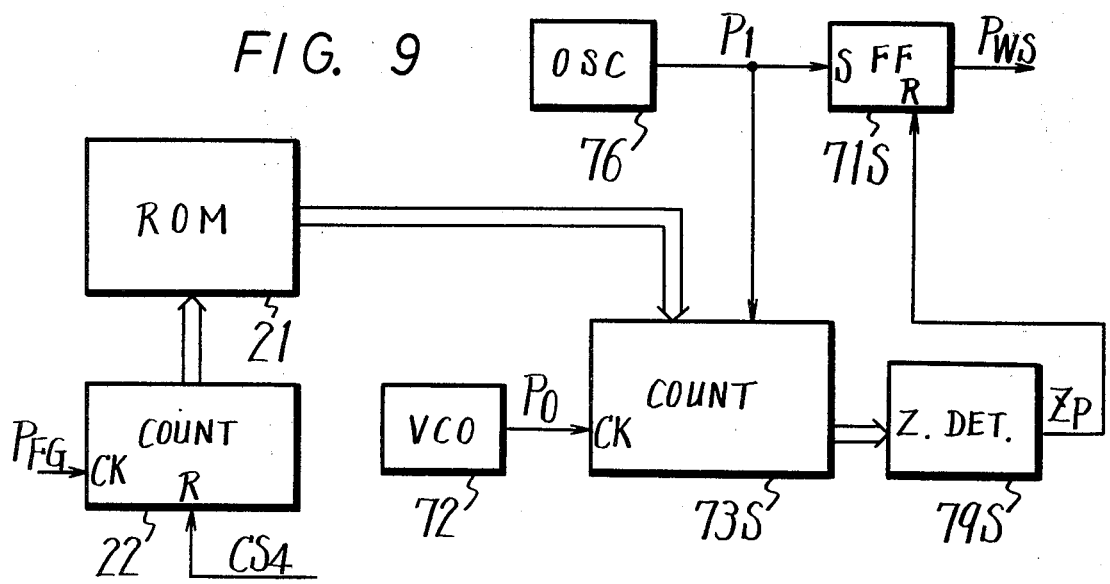

BRUSHLESS DC MOTOR

BACKGROUND OF THE INVENTION

1. Field of the Invention

This invention relates to a brushless DC motor, and more particularly is directed to an improved drive circuit for a brushless DC motor.

2. Description of the Prior Art

In the prior art, DC motor control circuits have been proposed which permit substantially constant torque to be developed by the motor regardless of the rotational angle of the motor shaft. For example, U.S. Pat. Nos. 3,383,574 and 3,517,289 teach the use of Hall-effect elements to control the current fed to the motor armature winding in sinusoidal relationship to the angular position of the rotor so as to obtain such substantially constant torque.

However, if, as in the above examples of the prior art, the magnetic field from the rotor is detected by two Hall-effect elements to directly produce sinusoidal currents flowing through the stator windings, a DC offset voltage is generated in the detected output from the Hall-effect elements so that a DC component is contained in the sinusoidal currents flowing through the stator windings. For this reason, the positive half-cycle interval of the sine wave is different in length from the negative half-cycle interval thereof to cause a torque ripple. The foregoing results from the fact that, even though several Hall-effect elements are made of the same material, sensitivities of the several elements are not coincident with each other but are dispersed. Accordingly, the output voltages thereof are also scattered to cause the torque ripple.

Further, it is difficult to magnetize the rotor magnet so as to make its magnetic field exactly sinusoidal, and, in the normal course of events, there will be uneven portions of the magnetization. This also causes the torque ripple.

OBJECTS AND SUMMARY OF THE INVENTION

Accordingly, it is an object of this invention to provide a brushless DC motor which is free of the above-mentioned drawbacks.

More specifically, it is an object of this invention to provide a drive circuit for a brushless DC motor which eliminates torque ripple.

It is another object of the invention to avoid torque ripple even though the magnetic field of the rotor magnet is not precisely sinusoidal and/or even though Hall-effect elements employed for detecting such field unavoidably have different gains or sensitivities.

A further object of the invention is to provide a pulse drive circuit for a brushless DC motor, as aforesaid, and which avoids the generation of noise in the audio frequency band.

A still further object of the invention is to provide an improved drive circuit for a brushless DC motor, as aforesaid, and in which a velocity or speed servo arrangement of simple construction and improved gain is realized.

In accordance with an aspect of this invention, a brushless DC motor having a rotor magnet establishing a sinusoidal magnetic field and two-phase stator windings at positions spaced from each other by an electrical angle which is an odd multiple of 90° is provided with a drive circuit constituted by a signal generator with an output frequency determined by the rotational speed of the rotor, and a memory in which there are stored digital information data converted from sampled values of a sinusoidal signal free of distortion; and, in operation of the motor, the digital information data stored in the memory is read out therefrom by the output of the signal generator in synchronism with the magnetic flux densities from the rotor magnet and is employed to determine currents flowing through the stator windings so that torque ripple is substantially eliminated.

A particularly desirable embodiment of the invention is further featured by a first oscillator with an oscillating frequency higher than the output frequency of the signal generator, a second oscillator with an oscillating frequency which is very substantially higher than the oscillating frequency of the first oscillator, a counter, a flip-flop and a pulse drive circuit for each of the stator windings. In this embodiment, the counter is reset by an output of the first oscillator and produces an output signal when an output of the second oscillator is counted to a number determined by data read out from the memory, and the flip-flop is set by the output of the first oscillator and reset by the output signal of the counter thereby to obtain a pulse signal supplied to the pulse drive circuit, and whose repetitive frequency corresponds to the oscillating frequency of the first oscillator. The resulting current made to flow through each stator winding has its direction changed between intervals of the positive and negative half cycles of the magnetic field applied to that stator winding.

It is another feature of this inventon to employ variable frequency oscillators for the above-mentioned first and second oscillators, and to differentially control the oscillating frequencies of such first and second variable frequency oscillators by a velocity servo signal so that an increased servo gain is achieved for quick response.

The above, and other objects, features and advantages of the present inventon, will be apparent from the following description of illustrative embodiments which is to be read in conjunction with the accompanying drawings.

BRIEF DESCRIPTION OF THE DRAWINGS

FIG. 5 is a block diagram showing a drive circuit of a brushless DC motor according to one embodiment of this invention;

FIGS. 6A and 6B, FIGS. 7A-7N and FIGS. 8A-8F are waveform diagrams to which reference will be made in explaining the operation of the drive circuit of FIG. 5; and FIG. 9 is a block diagram showing another embodiment of this invention.

DESCRIPTION OF THE PREFERRED EMBODIMENTS

Figure 1:
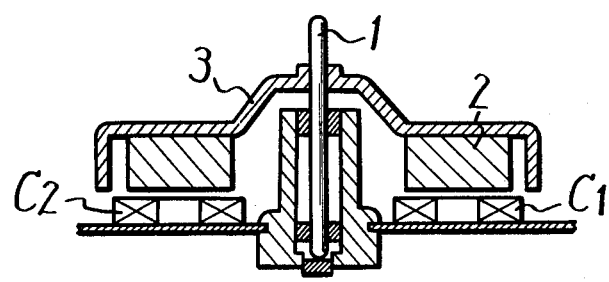
FIG. 1 is a vertical sectional view showing one example of a brushless DC motor.
Figure 2:
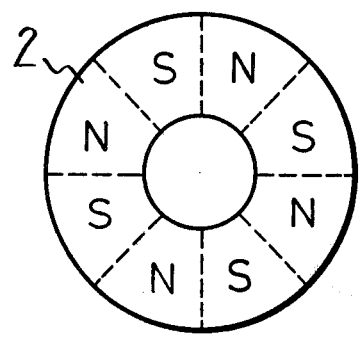
FIGS. 2 and 3 are schematic plan views respectively showing the rotor magnet and the stator windings of the motor of FIG. 1.

In order to promote better understanding of this invention, the general construction and characteristics of a brushless DC motor with a drive circuit according to the prior art will first be described with reference to FIGS. 1-4. Such brushless DC motor is adapted to provide a rotational torque which is always substantially constant regardless of the rotational or angular position of the rotor. In the illustrated example of the brushless DC motor of this kind, a rotor magnet is magnetized so as to provide a sinusoidal magnetic field and two-phase sinusoidal AC currents, which differ in phase from each other by 90°, are fed to two-phase stator windings thereby to obtain a torque which is always substantially constant regardless of the rotational angle of the rotor so that rotation free from uneven torque may be effected. More particularly, FIG. 1 shows such brushless DC motor to comprise a rotary shaft 1 on which there are secured a rotor magnet 2 and a rotor yoke 3. The rotor magnet 2 is composed of a permanent magnet attached to yoke 3 and which is magnetized to have a plurality of poles, for example, eight poles as shown in FIG. 2, which provide a sinusoidal magnetic field.

Figure 3:
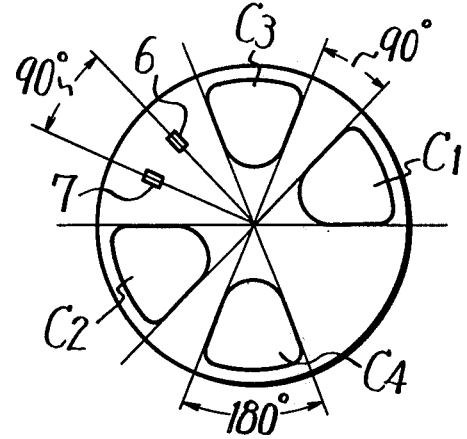
Figure 4:
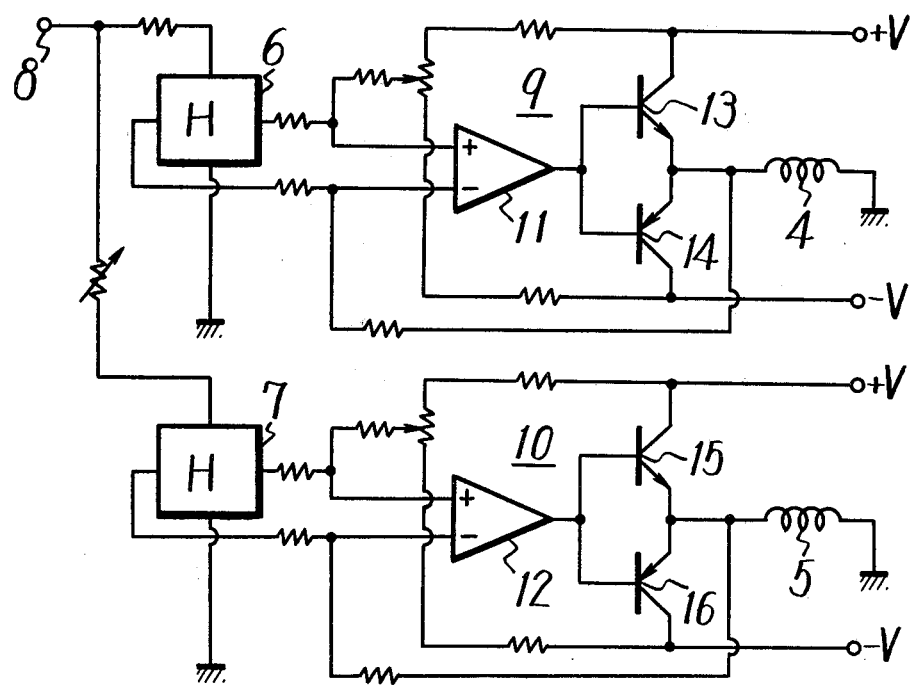
FIG. 4 is a circuit diagram showing one example of a drive circuit of a prior art brushless DC motor.

As shown in FIG. 3, stator winding blocks $C_1$ and $C_2$ are arranged so as to be in phase with each other relative to the magnetic field from rotary magnet 2 and are connected in series with each other to form a first stator winding 4 (FIG. 4). Stator winding blocks $C_3$ and $C_4$ are similarly arranged so as to be in phase with each other relative to the magnetic field from rotary magnet 2 and are also connected in series to each other to form a second stator winding 5. These first and second stator windings 4 and 5 are disposed opposite to rotary magnet 2 at positions which differ from each other in electrical angle, by 90° or an odd multiple thereof.

The magnetic field of rotor magnet 2 is detected by two Hall-effect elements, or Hall devices, 6 and 7 corresponding to the stator windings 4 and 5. The Hall device 6 is disposed at a position in-phase, in respect to its electrical angle, with stator winding 4, while Hall device 7 is disposed at a position in-phase, in respect to its electrical angle, with stator winding 5. In addition, Hall-effect elements 6 and 7 are dispersed for detecting magnetic flux from rotor magnet 2 at positions which differ from each other by an electrical angle of 90°.

In the known drive circuit for the brushless DC motor, as shown on FIG. 4, a DC current I is supplied through a terminal 8 to Hall-effect elements 6 and 7. Thus, in response to the rotation of rotor magnet 2, Hall-effect elements 6 and 7 generate sinusoidal voltages which are fed to amplifier circuits 9 and 10, respectively, having linear characteristics. More particularly, the sinusoidal output voltages derived from Hall-effect elements 6 and 7 are fed to respective operational amplifiers 11 and 12 at non-inverted and inverted input terminals thereof. Then, during each positive half-cycle period of the sinusoidal voltage from the Hall-element 6 or 7, the output of the respective operational amplifier 11 or 12 makes a transistor 13 or 15, respectively, conductive so that a current flows through such transistor 13 or 15 to the respective stator winding 4 or 5. During the negative half-cycle period of the sinusoidal voltage from the Hall-effect element 6 or 7, transistor 14 or 16, respectively, is made conductive so that a current flows through such transistor to the respective stator winding 4 or 5.

Accordingly, currents in proportion to the voltages derived from the Hall-effect elements 6 and 7 are supplied to the stator windings 4 and 5. If the rotational angle of the rotor is identified as $\theta$, magnetic flux density $\phi_1$ intersecting with stator winding 4 and magnetic flux density $\phi_2$ intersecting with the other stator winding 5 are expressed as:

$$\phi_1 = \phi_m \sin \theta \tag{1}$$

$$\phi_2 = \phi_m \cos \theta \tag{2}$$

where $\phi_m$ is a constant.

Further, the Hall-effect elements 6 and 7 are adapted to detect a sinusoidally variable magnetic field from rotor magnet 2 to generate voltages proportional to magnetic flux densities $\phi_1$ and $\phi_2$. These voltages are fed to amplifier circuits 9 and 10, so that currents $i_1$ and $i_2$ flowing through stator windings 4 and 5, respectively, are expressed as follows:

$$i_1 = K \sin \theta \tag{3}$$

$$i_2 = K \cos \theta \tag{4}$$

where K is a value unrelated to the rotational angle $\theta$ and which remains constant so long as the current I is constant. Therefore, forces $F_1$ and $F_2$ generated by the stator windings 4 and 5 are $$F_1 = i_1 \cdot \phi_1 = \phi_m K \sin^2 \theta \tag{5}$$

$$F_2 = i_2 \cdot \phi_2 = \phi_m K \cos^2 \theta \tag{6}$$

As a result, the force F to which the rotor magnet 2 is subjected is:

$$\begin{aligned} F &= F_1 + F_2 \\ &= \phi_m K (\sin^2 \theta + \cos^2 \theta) \\ &= \phi_m K \end{aligned} \tag{7}$$

Hence, the force F, and similarly the torque, is constant and independent of the rotational angle $\theta$ of the rotor.

By way of summary, in the above-described brushless DC motor, the rotor magnet is magnetized so as to provide a sinusoidal magnetic field, and sinusoidal AC signals having phases that differ from each other by 90° are supplied to the two-phase stator windings with the intention that a constant torque can be obtained independent of the rotational angle of the rotor, and a DC motor free from uneven torque can be realized.

However, as briefly mentioned above, when magnetic flux density from the rotor is detected by two Hall-effect elements and sinusoidal currents flowing through the stator windings are provided directly from the detected outputs of such elements, a DC offset voltage is generated in the detected outputs of the Hall-effect elements and, hence, the sinusoidal currents flowing through the stator windings contain DC components. Therefore, the positive and negative intervals of a sinusoidal wave are of different lengths and this may cause torque ripple. Further, even though the Hall-effect elements are made from the same material, the sensitivities thereof may not be the same. Accordingly, the output voltages of the Hall-effect elements may also be scattered. Thus, in the above example, if the output voltage of Hall-effect element 6 is not the same as the output voltage of element 7, torque ripple may also be caused.

Further, in magnetizing the rotor magnet, it is difficult to make the magnetic field variable precisely in a sinusoidal mode, and uneven magnetization is normally apparent. In such case, if the magnetic field from the unevenly magnetized rotor magnet 2 is detected to form the sinusoidal signal to be supplied to the stator winding 4 or 5, current flowing through the stator winding will also cause torque ripple.

Figures 5, 6A, 6B:
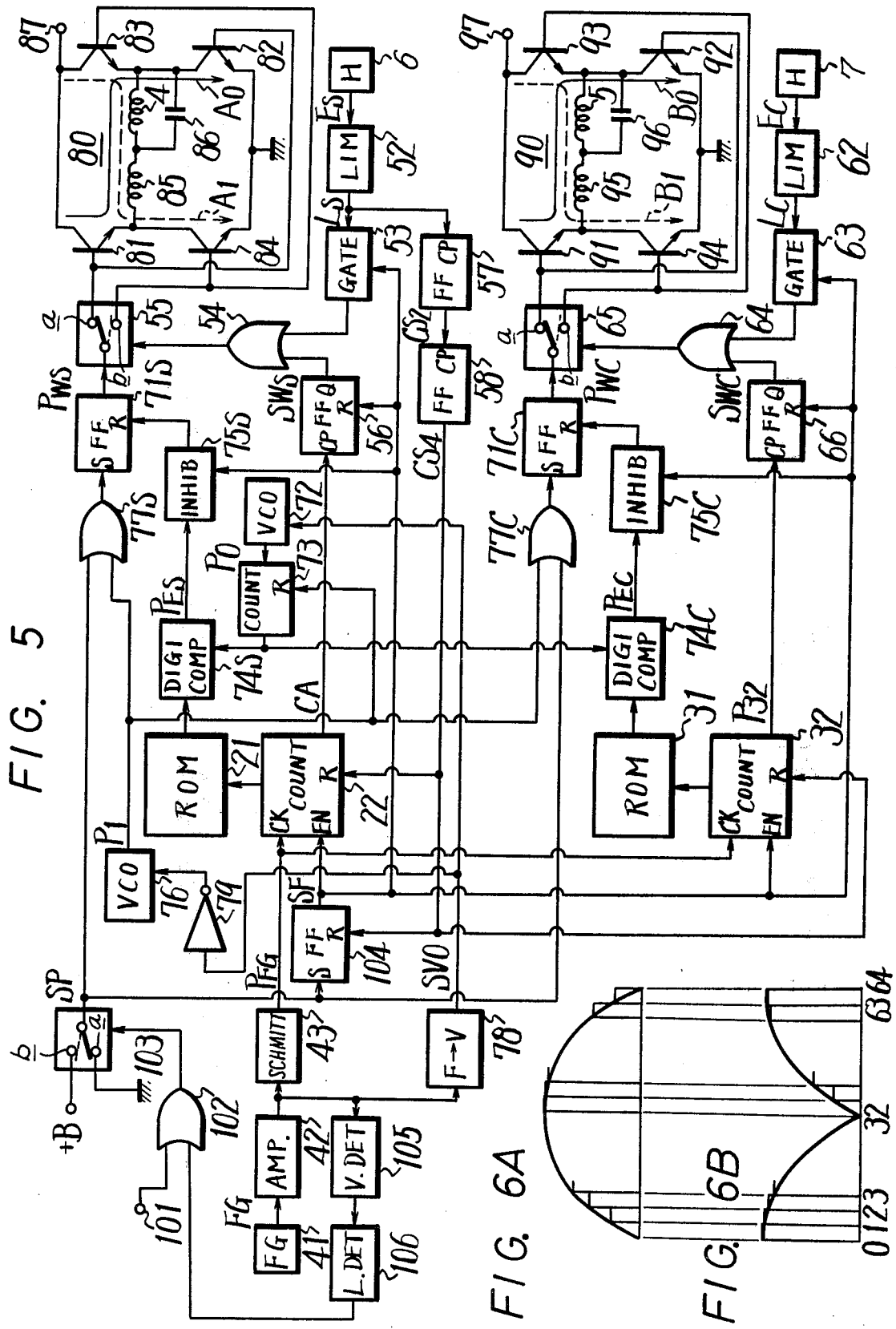

Referring now to FIG. 5, it will be seen that a drive circuit according to an embodiment of this invention for a brushless DC motor of the type described above with reference to FIGS. 1-3 generally comprises memories 21 and 31 which are desirably in the form of a read-only memories or ROMs. The information data stored in ROM 21 differs in phase by 90° from the information data stored in ROM 31. By way of example, ROM 21 has stored therein information data for the positive half-cycle of a sine wave shown on FIG. 6A, while ROM 31 has stored therein the information data for a half-cycle period of a sine wave which is shifted 90° in phase from the sine wave of FIG. 6A and which is further subjected to full-wave rectification, as shown on FIG. 6B.

A frequency generator indicated schematically at 41 on FIG. 5 is provided, for example, on the rotor shaft 1 of the motor shown on FIG. 1 to produce a signal or pulse FG which occurs N times during each revolution of the rotor so as to have a frequency corresponding to the rotational speed of the rotor. In the drive circuit of FIG. 5, it is intended that the previously mentioned wave form information data stored in ROMs 21 and 31 should be read out therefrom in synchronism with the signal FG. To this end, it is necessary that the waveform information data stored in ROMs 21 and 31 should represent samplings of the waveforms of FIGS. 6A and 6B which are determined by the number of occurrences of the signal FG during each revolution of the rotor and also by the number of poles with which the rotor magnet 2 is magnetized.

For example, if frequency generator 41 is designed to provide 512 occurrences of signal FG during each revolution of rotor shaft 1 and rotor magnet 2 is magnetized so as to have eight poles, as on FIG. 2, there are four periods of the sinusoidal magnetic field for each revolution of the rotor and, hence, there are 64 occurrences of the signal FG from generator 41 during the period corresponding to a half-cycle of the sinusoidal magnetic field. Therefore, in the case of the foregoing example, the waveforms shown on FIGS. 6A and 6B are each sampled by 64 successive sampling pulses, and the successive sampled values are stored in ROMS 21 and 31, respectively, at addresses "0" to "63". More particularly, in the embodiment illustrated on FIG. 5, 8-bit digital codes or information data representing the sampled values of the waveforms shown on FIGS. 6A and 6B are stored at the respective addresses in ROMs 21 and 31, and such 8-bit digital codes are successively read out of ROMS 21 and 31 in synchronism with the signal FG.

In order to identify the addresses in ROMS 21 and 31 from which the 8-bit digital codes or information data are to be read out in succession, the drive circuit of FIG. 5 further comprises counters 22 and 32, and an amplifier 42 through which the signal FG from frequency generator 41 is supplied to a Schmitt trigger circuit 43 where it is shaped, from its original substantially sinusoidal configuration, into a rectangular pulse $P_{FG}$ (FIG. 8C) applied to clock inputs CK of counters 22 and 32 for counting by the latter. For satisfying the requirements of equation (7) above, the digital information data representing sampled values of the waveform of FIGS. 6A and 6B must be read out from ROMs 21 and 31 in synchronism with the magnetic field of rotor magnet 2. In other words, read-out from the "0" address of each of ROMs 21 and 31 must be initiated at a time when rotor magnet 2 is rotationally positioned so that its magnetic field, as applied to, for example, stator winding 4 is rising up from a zero-cross point, for example, the point P on FIG. 7C, whereupon, the digital codes or information data are read out from the remaining addresses "1", "2", "3",—"63" in sequence.

In order to achieve the foregoing synchronization of the read-out from ROMs 21 and 31 with the magnetic field of rotor magnet 2, the Hall-effect element 6 is disposed at a position where the effect of the magnetic field of rotor magnet 2 thereon is the same, in phase, as the sinusoidal magnetic field $EH_S$ (FIG. 7C) applied from rotor magnet 2 to stator winding 4 upon rotation of the rotor. The output $E_S$ of Hall-effect element 6 is applied to a limitor 52 so as to derive therefrom a rectangular wave signal $L_S$ (FIG. 7D) which is, in turn, fed to a flip-flop to trigger the latter by its rising edge and thereby produce an output signal $CS_2$ (FIG. 7E) whose frequency is one-half that of the signal $L_S$. Such signal $CS_2$ is applied to a flip-flop 58 to trigger the latter by its rising edge and thereby produce a signal $CS_4$ (FIG. 7F) whose frequency is one-half that of the signal $CS_2$, that is, one-quarter of the frequency of the signal $L_S$. The signal $CS_4$ from flip-flop 58 is applied to the reset terminals R of counters 22 and 32, respectively, for resetting both counters simultaneously at the rising edge of the signal $CS_4$. The signal $CS_4$ is seen to have one rising edge for each revolution of the rotor and which occurs at a time corresponding to a rising up of the magnetic field $EH_S$ (FIG. 7C) from a zero-cross point P. As a result, counters 22 and 32 are reset once during each revolution of the rotor when the latter is at the rotational angular position corresponding to the zero-cross point P of the magnetic field $EH_S$ applied to stator winding 4, and, thereafter, counter 22 and 32 count the pulses $P_{FG}$ in sequence up to "63" and return to "0" on counting a further pulse. The contents of counters 22 and 32 are applied to ROMs 21 and 32, respectively, as read-out addresses for the latter. Thus, the digital information data representing the 64 sampled values of the waveform of FIG. 6A are read out, in sequence, from the 64 addresses of ROM 21 eight times during each revolution of the rotor in synchronism with the magnetic field $EH_S$, and the digital information data representing 64 sampled values of the waveform of FIG. 6B are similarly read out, in sequence, from the 64 addresses of ROM 31 eight times during each revolution of the rotor in synchronism with magnetic field $EH_S$.

The 8-bit digital information data read out from ROMs 21 and 31 in the manner described above are coverted into pulse-width modulation signal $P_{WS}$ and $P_{WC}$, respectively, derived from flip-flop $71_S$ and $71_C$. More particularly, in the drive circuit of FIG. 5, a voltage controlled or variable frequency oscillator 72 provides an oscillation output or signal $P_o$ having a variable frequency $f_o$ higher than the repetitive frequency $f_{FG}$ of the pulses $P_{FG}$. The oscillation output $P_o$ is counted by an 8-bit counter 73 which has its output, in the form of 8-bit information data, applied to digital comparators 74S and 74C which also receive the 8-bit information data read out from ROMs 21 and 31, respectively. The outputs of digital comparators 74S and 74C are applied through inhibit gate circuits 75S and 75C, respectively, to reset terminals R of flip-flops 71S and 71C, respectively. Such inhibit gate circuits 75S and 75C are closed only during the starting of the operation of the motor and are open when the motor is in its normal rotating state, as will be further described hereinafter. As oscillator 76 which is preferably also a voltage controlled or variable frequency oscillator, as shown, provides an oscillation output or signal $P_1$ having a center frequency $f_1$ which is outside the audio frequency band and selected to be very substantially lower than the frequency $f_o$ of the oscillation output $P_o$ of oscillator 72 while being higher than the frequency of $f_{FG}$ of the pulses $P_{FG}$, as is apparent from a comparison of FIGS. 8B, 8C and 8D.

The output $P_1$ (FIG. 8B) of oscillator 76 is supplied through OR gates 77S and 77C to set terminals of flip-flops 71S and 71C, respectively, to simultaneously set both of such flip-flops. The output $P_1$ from oscillator 76 is also supplied to a reset terminal R of counter 73 to reset the latter. Accordingly, counter 73 counts the pulses of signal $P_o$ (FIG. 8B) from oscillator 72 starting from each pulse of the output $P_1$ (FIG. 8D) of oscillator 76, and the resulting count of counter 73, in the form of 8-bit information data, is compared in digital comparator 74S, with the 8-bit information data then being read-out from ROM 21. Upon coincidence of all bits of the digital information data being applied to comparator 74S from ROM 21 and from counter 73, respectively, comparator 74S provides an equivalence output pulse $P_{ES}$ (FIG. 8E) which, in the normal rotating state of the motor, is supplied through the open inhibit gate circuit 75S to reset terminal R of flip-flop 71S for resetting the latter. Similarly, digital comparator 74C compares the 8-bit information data being read out from ROM 31 with the 8-bit information data representing the count of counter 73 and, upon coincidence of all bits of such inputs to comparator 74C, the latter provides an equivalence output pulse $P_{EC}$ which is supplied through the open inhibit gate circuit 75C, in the normal rotating state of the motor, to reset terminal R of flip-flop 71C to reset the latter. As previously described, the data sequentially read out from the addresses of ROMs 21 and 31 in synchronism with the pulses $P_{FG}$ (FIG. 8C) and applied to comparators 74S and 74C, respectively, are actually 8-bit binary coded data or signals. However, for ease of understanding, on FIG. 8A a group of such digital information data $D_0$, $D_1$, $D_2$—are shown by their analog levels.

In any case, flip-flop 71S provides a pulse width modulation signal $P_{WS}$ (FIG. 8F) having a repetitive frequency equal to the frequency $f_1$ of the output $P_1$ from oscillator 76 and a pulse width determined, at its front edge, by a point in time for example, the rising edge, of the pulse $P_{FG}$, and, at its rear edge, by the point in time of the equivalence output pulse $P_{ES}$. Similarly, flip-flop 71C provides a pulse width modulation signal $P_{WC}$ having a repetitive frequency equal to the frequency $f_1$ and a pulse width determined, at its front edge by the point in time of, for example, the rising edge of pulse $P_{FG}$, and, at its rear edge, by the point in time of the equivalence output pulse $P_{EC}$.

It will be appreciated that the number of pulses $P_o$ from oscillator 72 counted by counter 73 from the occurrence of each pulse $P_1$ until the occurrence of the equivalence output pulses $P_{ES}$ and $P_{EC}$ are determined by the digital information data being read out from ROMs 21 and 31. Thus, the width of each pulse of the signals $P_{WS}$ and $P_{WC}$ within the interval of a complete cycle of the pulse $P_{FG}$ is proportional to the digital information data being read out from ROMs 21 and 31, respectively, and, hence, is proportional to the respective sampling level of the waveforms of FIGS. 6A and 6B. Since the information data stored in ROMs 21 and 31 are for only a half-cycle of a sine wave, the pulse width modulation signals $P_{WS}$ and $P_{WC}$ repeat the same signal at every half-cycle, as shown on FIGS. 7G and 7L. Thus, the signals $P_{WS}$ and $P_{WC}$ represent full-wave rectified sine waves, rather than sine waves as such.

Accordingly, in the embodiment of the invention illustrated on FIG. 5, switch circuits 55 and 65 are employed for applying the pulse width modulation signals $P_{WS}$ and $P_{WC}$, respectively, to pulse drive circuits 80 and 90 which are associated with the stator windings 4 and 5, respectively. In order to control switch circuits 55 and 56 in synchronism with the magnetic field $EH_S$ (FIG. 7C) and the magnetic field $EH_C$ (FIG. 7J), respectively, flip-flops 56 and 66 have their outputs $SW_S$ an $SW_C$ applied through OR gates 54 and 64 as switching signals for the switch circuits 55 and 65, respectively. Flip-flop 56 is triggered by a carry pulse CA (FIG. 7H) issuing from counter 22 whenever the latter completes the counting to "63" and returns to "0", while flip-flop 66 is triggered by a pulse $P_{32}$ (FIG. 7M) obtained from counter 32 each time the latter counts to "32". Thus, the carry pulse CA and the pulse $P_{32}$ appear at times corresponding to zero-cross points of the sinusoidal magnetic fields $EH_S$ and $EH_C$ applied to stator windings 4 and 5 at each half-cycle of such sinusoidal magnetic fields. As will be later described in detail, in shifting from the starting condition of the motor to the normal rotating state thereof, flip-flops 56 and 66 are reset to establish their respective outputs $SW_S$ (FIG. 7I) and $SW_C$ (FIG. 7N) at the level "1". Thereafter, flip-flops 56 and 66 are triggered by each carry pulse CA and pulse $P_{32}$, respectively, so as to reverse or invert the respective outputs $SW_S$ and $SW_C$. In other words, once the normal rotating state of the motor has been established, each triggering of flip-flop 56 by carry pulse CA and each triggering of flip-flop 66 by pulse $P_{32}$ will invert the output $SW_S$ or $SW_C$ from the level "1" to "0" or from the level "0" to "1". In any case, in the normal rotating state of the motor, the output $SW_S$ of flip-flop 56 is at the level "1" during each positive half-cycle of sinusoidal magnetic field $EH_S$ and is changed over to the level "0" during each negative half-cycle of that magnetic field. Similarly, the output $SW_C$ of flip-flop 66 is at the level "1" during each positive half-cycle of sinusoidal magnetic field $EH_C$ and is changed over to the level "0" during each negative half-cycle of that magnetic field. Such outputs $SW_S$ and $SW_C$, when applied to switch circuits 55 and 65 through OR gates 54 and 64, respectively, are effective to dispose the switch circuits 55 and 65 in the states shown in full lines on FIG. 5 when outputs $SW_S$ and $SW_C$ are at the level "1". Further, switch circuits 55 and 65 are changed over to the states indicated in broken lines on FIG. 5 when the respective switch control signals $SW_S$ and $SW_C$ are changed over to the level "0".

The pulse drive circuit 80 is shown to include transistors 81 and 82 connected, at their bases, to contact a of switch circuit 55, and transistors 83 and 84 similarly connected at their bases to contact b of switch circuit 55. The collectors of transistors 81 and 83 are connected together to a terminal 87 to which a positive voltage is suitably applied, and the emitters of transistors 82 and 84 are connected together to ground. The emitters of transistors 81 and 83 are connected to the collectors of transistors 84 and 82, respectively. The stator winding 4 is connected in series with an inductance 85 and in parallel with a capacitor 86 in a circuit which is connected between the connected together emitter and collector of transistors 81 and 84, respectively, and the connected together emitter and collector of transistors 83 and 82, respectively Similarly, pulse drive circuit 90 includes transistors 91 and 92 connected, at their bases, to contact a of switch circuit 65, and transistors 93 and 94 connected, at their bases, to contact b of switch circuit 65. Transistor 91 and 93 are shown to have their collectors connected together to a terminal 97 to which a positive voltage is suitably applied, while the emitters of transistors 92 and 94 are connected together to ground. The emitters of transistors 91 and 93 are connected to the collectors of transistor 94 and 92, respectively. The stator winding 5 of the motor is shown to be connected in series with an inductance 95 and in parallel with a capacitor 96 in a circuit which is connected between the connected together emitter and collector of transistors 91 and 94, respectively, and the connected together emitter and connector of transistors 93 and 92, respectively.

With the pulse drive circuits 80 and 90 as described above, when switch circuits 55 and 65 are in the conditions shown in full lines on FIG. 5, that is, with their movable contacts engaging the respective fixed contacts a, transistors 81 and 82 in circuit 80 and transistors 91 and 92 in circuit 90 are turned ON during those intervals when outputs $P_{WS}$ and $P_{WC}$ of flip-flops 71S and 71C, respectively, are "1". When transistors 81 and 82 are thus turned ON, a driving current flows from terminal 87 through stator winding 4 in the direction indicated by the arrow $A_o$ in full lines on FIG. 5. Similarly, when transistors 91 and 92 are turned ON, a driving current flows from terminal 97 through stator winding 5 in the direction of the arrow $B_o$ in full lines on FIG. 5. When switch circuits 55 and 65 are changed over to the conditions indicated in broken lines on FIG. 5, that is, in which their movable contacts engage the respective fixed contacts b, transistors 83 and 84 in circuit 80 and transistors 93 and 94 in circuit 90 are turned ON during those intervals when the outputs $P_{WS}$ and $P_{WC}$ of flip-flops 71S and 71C, respectively, are "1". When transistors 83 and 84 are thus turned ON, a driving current flows from terminal 87 through stator winding 4 in the direction of the arrow $A_1$ in broken lines on FIG. 5 and, similarly, when transistors 93 and 94 are turned ON, a driving current flows from terminal 97 through stator winding 5 in the direction of the arrow $B_1$ in broken lines on FIG. 5.

As previously mentioned, in the normal rotating state of the motor, outputs $P_{WS}$ and $P_{WC}$ of flip-flops 71S and 71S are pulse-width modulation signals corresponding to the sine wave information data stored in ROMs 21 and 31. By reason of the described operation of switch circuits 55 and 65 and pulse drive circuits 80 and 90, stator windings 4 and 5 are supplied with the equivalent of substantially sinusoidal currents. In the embodiment illustrated on FIG. 5, the inductance 85 and the capacitor 86 included in pulse drive circuit 80 and the similar inductance 95 and capacitor 96 included in circuit 90 act as low-pass filters for removing high-frequency components from the currents flowing through stator windings 4 and 5, respectively. However, it has been found that, in practice, suitable operation of the motor is obtained even if such low-pass filters are omitted.

Since stator windings 4 and 5 are supplied with driving currents in synchronism with the magnetic fields $EH_S$ and $EH_C$ respectively applied thereto by rotor magnet 2, the conditions of equation (7) are satisfied for eliminating torque ripple even if the magnetic field of rotor magnet 2 is not precisely sinusoidal, and even if the Hall-effect elements 6 and 7 have different sensitivities. Since counters 22 and 32 are reset at every revolution of the rotor in response to the rising edge of output $CS_4$ of flip-flop 58, the occurrence of a counting error in counter 22, and/or in counter 32, in the course of a revolution of the rotor can be substantially neglected, in its effect on waveform distortion, as a new count is started at the commencement of each revolution.

In the above description of the operation of a brushless DC motor with a drive circuit according to this invention, it has been assumed that the motor is in its normal rotating state to provide the signal FG from frequency generator 41. However, at the instant when operation of the motor is started or initiated, the rotor is not rotating so that the signal FG cannot be derived from frequency generator 41 to cause the read out from ROMs 21 and 31. Accordingly, for effecting the starting operation of the brushless DC motor, the drive circuit of FIG. 5 is further shown to comprise a terminal 101 which receives a signal of the level "1" only during an interval when a starting switch (not shown) is manually depressed. Such signal is supplied from terminal 101 through an OR gate 102 to a switch circuit 103 for changing over the latter from its normal state or condition shown in full lines, and in which a connection to ground is established through its contact a, to an actuated state shown in broken lines on FIG. 5, and in which the movable contact of switch circuit 103 engages its contact b connected with a voltage source +B. Thus, in response to manual depressing of the starting switch, a pulse SP (FIG. 7A) rising to the level "1" is derived from switch circuit 103 and is supplied through OR gates 77S and 77C to set terminals S of flip-flops 71S and 71C, respectively. Thus, flip-flops 71S and 71C are set upon manual depressing of the starting switch and the outputs $P_{WS}$ and $P_{WC}$ (FIGS. 7G and 7L) of such flip-flops become "1". The pulse SP from switch circuit 103 is also supplied to a set terminal S of a flip-flop 104 to set the latter and thereby cause its output signal SF (FIG. 7B) to rise to the level "1". Such output signal SF is applied to inhibit gate circuits 75S and 75C to close the latter so long as the signal SF is at the level "1", whereby there can be no application of reset pulses to flip-flops 71S and 71C so long as the signal SF is "1" and, accordingly, outputs $P_{WS}$ and $P_{WC}$ are maintained at the level "1".

Moreover, the output $L_S$ (FIG. 7D) of limiter 52 is applied to a gate circuit 53 which has its output connected to OR circuit 54. The Hall-effect element 7 which detects the magnetic field $EH_C$ (FIG. 7J) from rotor magnet 2 supplies the corresponding detected voltage $E_C$ to a limiter 62 which provides therefrom a rectangular wave signal $L_C$ (FIG. 7K) applied to a gate circuit 63 which has its output connected to OR circuit 64. The output SF of flip-flop 104 is also applied, as a gating signal, to gate circuits 53 and 63 so that such gate circuits are open only during the interval when output SF of flip-flop 104 is "1". During such interval when gate circuits 53 and 63 are open, output signals $L_S$ and $L_C$ (FIGS. 7D and 7K) of limiters 52 and 62 are respectively supplied through gate circuits 53 and 63, and further through OR gates 54 and 64, to switch circuits 55 and 65 for effecting the selective changing over of such switch circuits.

The signals $L_S$ and $L_C$ are seen to be synchronized with the sinusoidal magnetic fields $EH_S$ and $EH_C$, respectively, applied to stator windings 4 and 5. Each interval in which signal $L_S$ or $L_C$ is "1" corresponds to a positive half-cycle of the respective magnetic field $EH_S$ to $EH_C$, and each interval in which signal $L_S$ or $L_C$ is "0" corresponds to a negative half-cycle of the respective magnetic field $EH_S$ or $EH_C$. Since the outputs $P_{WS}$ and $P_{WC}$ of flip-flops 71S and 71C, respectively, are maintained at "1" throughout the starting period, as mentioned previously, during each interval in which a positive half-cycle of the sinusoidal magnetic field $EH_S$ is applied to stator winding 4, switch circuit 55 is in the condition shown in full lines on FIG. 5 and, therefore, a constant current flows through stator winding 4 in the direction indicated by arrow $A_o$. Similarly, during the interval in which a positive half-cycle of the sinusoidal magnetic field $EH_C$ is applied to stator winding 5, switch circuit 65 is in the condition shown in full lines on FIG. 5 and, therefore, a constant current flows through stator winding 5 in the direction indicated by arrow $B_o$. On the other hand, during the interval in which a negative half-cycle of sinusoidal magnetic field $EH_S$ is applied to stator winding 4, switch circuit 55 is changed over to the condition illustrated in broken lines on FIG. 5 so that a constant current flows through stator winding 4 in the direction indicated by arrow $A_1$. Similarly, during the interval in which a negative half-cycle of sinusoidal magnetic field $EH_C$ is applied to stator winding 5, switch circuit 65 is changed over to the condition shown in broken lines so that a constant current flows through stator winding 5 in the direction indicated by arrow $B_1$. Thus, a so-called switching-drive condition is established for starting the motor. It will further be seen that the output SF of flip-flop 104 is applied to enable terminals EN of counters 22 and 32 to prevent counting operation of the latter so long as output SF is "1". Thus, during the starting period in which the output SF is "1", counters 22 and 32 are inoperative to count the pulses $P_{FG}$ from Schmitt trigger circuit 43.

By reason of the above described constant currents alternately flowing through stator windings 4 and 5 in one direction and then the other in the switching-drive condition, turning of the rotor commences. When the rotor attains the rotational angular position at which a rising zero-cross point P of magnetic field $EH_S$ is first detected by Hall-effect element 6, output $CS_4$ of flip-flop 58 rises to the level "1" to reset counters 22 and 32, and also to reset flip-flop 104 so that the output SF of the latter becomes "0". As a result of the return of output SF of flip-flop 104 to "0", counters 22 and 32 are enabled to start the counting of the pulses $P_{FG}$ from Schmitt trigger circuit 43. The counting operations of counters 22 and 32 cause the latter to provide read-out addresses for ROMs 21 and 31 so that the waveform information data stored in each of the ROMs are read out therefrom in sequence. Further, the return of output SF of flip-flop 104 to "0" is effective to open inhibit gate circuits 75S and 75C so that equivalence pulses $P_{ES}$ and $P_{EC}$ can pass therethrough as reset pulses for flip-flops 71S and 71C, respectively, whereupon outputs $P_{WS}$ and $P_{WC}$ of flip-flop 71S and 71C become pulse-width modulation signals, as described above for the normal rotating state of the motor.

The return of output SF of flip-flop 104 to "0" is also effective to close gate circuits 53 and 63 with the result that, thereafter, switch circuits 55 and 65 are controlled by outputs $SW_S$ and $SW_C$ of flip-flops 56 and 66, respectively. Furthermore, the output SF of flip-flop 104 is shown to be applied to reset terminals R of flip-flops 56 and 66 which are reset by the falling edge of output SF.

Thus, as shown on FIGS. 7I and 7N, outputs $SW_S$ and $SW_C$ rise up to "1" in synchronism with the change of output SF of flip-flop 104 from "1" to "0". Thereafter, as described above in connection with the normal rotating state of the motor, flip-flops 56 and 66 invert their respective outputs in response to each carry pulse CA from counter 22 and each pulse $P_{32}$ from counter 32, respectively, so that switch circuits 55 and 65 are changed-over by outputs $SW_S$ and $SW_C$, respectively, in synchronism with the effect of magnetic fields $EH_S$ and $EH_C$ on stator windings 4 and 5, respectively. Thus, the change-over of the operation of the motor from its starting condition to the normal rotating state is completed.

The reason for employing the outputs $E_S$ and $E_C$ of Hall-effect elements 6 and 7 for controlling switch circuits 55 and 65 in the starting condition, and then changing over to the outputs $SW_S$ and $SW_C$ of flip-flops 56 and 66 for controlling switch circuits 55 and 65 when the normal rotating state of the motor has been attained, is to ensure that signals of the highest possible accuracy are employed for controlling switch circuits 55 and 65 in the normal rotating state and thereby improving the normal rotating characteristics of the motor. However, if the outputs $L_S$ and $L_C$ of limiters 52 and 62 are obtained with sufficiently high accuracy, such outputs may be used to control switch circuits 55 and 65 both during the starting period and also when the motor is in the normal rotating state, that is, flip-flops 56 and 66 and the associated OR circuits 54 and 64 may be omitted and direct connections provided between gates 53 and 63 and switch circuits 55 and 65, respectively.

In the event that, with the motor in its normal rotating state, an external force is applied to forceably stop the rotation of the rotor, pulse $P_{FG}$ is no longer produced by Schmitt trigger circuit 43 and, hence, normal operation of the motor cannot continue. In order to deal with the foregoing situation, the drive circuit shown on FIG. 5 further includes a velocity detecting circuit 105 connected to the output of amplifier 42 to derive therefrom a voltage proportional to the frequency of the signal FG from frequency generator 41. Such voltage produced by circuit 105 is supplied to a level detecting circuit 106 so that, when the rotational speed of the rotor is lowered to a predetermined extent, level detecting circuit provides a signal "1" which is supplied through OR gate 102 to switch circuit 103 for again changing over the latter to the condition shown in broken lines. Accordingly, as in the previously described starting operation, a pulse SP of the level "1" is derived from switch circuit 103 to set flip-flops 71S, 71C and 104 so that currents are made to flow through stator windings 4 and 5 as in the so-called switching-drive condition described with reference to the starting operation. When the speed of rotation of the rotor is suitably increased, switch circuit 103 is returned to the condition shown in full lines and, upon the resetting of flip-flop 104, the switching-drive condition characteristic of the starting operation is terminated and rotation of the rotor is maintained in the normal rotating state.

It will further be appreciated that a drive circuit for a brushless DC motor according to this invention is desirably adapted to have a rotary velocity servo arrangement of simple construction. More particularly, in the embodiment of FIG. 5, oscillators 72 and 76 employed for producing the pulse-width modulation signals are of a voltage controlled or variable frequency type, a previously mentioned, and the signal FG from frequency generator 41, as amplified by amplifier 42, is applied to a frequency-to-voltage converting circuit 78 which provides a voltage SVO varying with changes in the rotational speed of the rotor. Such voltage SVO is applied to variable frequency oscillator 72 to control the oscillating frequency of the latter. As the frequency of the output of $P_o$ of oscillator 72 is changed, the times required by counter 73 for the counting of the numbers of pulses or cycles of the signal $P_o$ corresponding to the digital information data then being read out of ROMs 21 and 31 are changed so as to correspondingly change the points in time at which equivalence pulses $P_{ES}$ and $P_{EC}$ are generated by digital comparators 74S and 74C, respectively. Accordingly, the individual pulse widths of the pulse-width modulation signal $P_{WS}$ and $P_{WC}$ for each cycle of the pulse $P_{FG}$ are changed and, hence, the generated torque is varied.

When the rotational speed of the motor exceeds the predetermined or normal value, the frequency of signal FG is increased and the output voltage SVO of converting circuit 78 is correspondingly increased to increase the oscillating frequency of oscillator 72. As a result of the foregoing, the pulse widths of signals $P_{WS}$ and $P_{WC}$ are reduced and the rotational speed is lowered towards the predetermined or normal value. Conversely, when the rotational speed of the motor falls below the predetermined or normal value, the oscillating frequency of oscillator 72 is lowered and the pulse widths of signals $P_{WS}$ and $P_{WC}$ are increased so as to increase the rotational speed of the rotor toward the predetermined or normal value. Thus, the velocity servo can be attained merely by controlling the oscillating frequency of oscillator 72.

However, in order to increase the servo gain and thereby provide a quick response to any deviation from the predetermined rotational speed, the output voltage SVO of converting circuit 78 is preferably also supplied through an inverter 79 to oscillator 76 so as to control the oscillating frequency of the latter in a differential manner in respect to the control of oscillator 72. Thus, when the rotational speed of the motor exceeds the predetermined or normal value, the oscillating frequency of oscillator 76 is decreased to reduce the number of pulses of the signals $P_{WS}$ and $P_{WC}$ within each cycle of pulse $P_{FG}$, with the result that the rotational speed of the motor is thereby lowered. Conversely, when the rotational speed of the motor becomes less than the predetermined or normal value, the oscillating frequency of oscillator 76 is increased to increase the number of pulses of signals $P_{WS}$ and $P_{WC}$ within each cycle of pulse $P_{FG}$ with the result that the rotational speed of the motor is increased toward the normal value.

It will be appreciated that, since both the pulse width and the number of pulses of the pulse-width modulation signals $P_{WS}$ and $P_{WC}$ in each cycle of the pulse $P_{FG}$ which determines the rate of read-out from ROMs 21 and 31 are differentially changed by velocity servo signal SVO, a relatively high servo gain is achieved and a quick response to any deviation of the rotational speed from the predetermined or normal value is attained.

In the embodiment of FIG. 5, the equivalence output pulses $P_{ES}$ and $P_{EC}$ from digital comparators 74S and 74 C are employed for determining the individual pulse widths of the pulse width modulation signals $P_{WS}$ and $P_{WC}$ on the basis of comparisons of the digital output of counter 73 with the digital information data being read out from ROMs 21 and 31, respectively. However, similar pulse-width modulation signals $P_{WS}$ and $P_{WC}$ can be produced from counter outputs alone, and without employing the digital comparators 74S and 74C.

More particularly, as shown on FIG. 9, in a drive circuit for a brushless DC motor according to another embodiment of this invention, and in which components of the drive circuit corresponding to those previously described with reference to FIG. 5 are identified by the same reference numerals, the digital information data read out from ROM 21 is preset in a counter 73S in response to an output pulse $P_1$ from oscillator 76. The counter 73S is a down-counter, that is, the output $P_o$ of oscillator 72 is down-counted in counter 73S from the value preset in the latter and which corresponds to the digital information data read out from ROM 21. When the content of counter 73S has been counted down to "0" so that all bits in the output of such counter become zero, a zero-detecting circuit 79S produces an output pulse ZP which is applied to reset terminal R of flip-flop 71S for resetting the same. It will be appreciated that the output pulse ZP from zero-detecting circuit 79S in equivalent to the equivalence output pulse $P_{ES}$ from digital comparator 74S in FIG. 5. In other words, the down-counting to zero from the value of the data read out from ROM 21, as in the embodiment of FIG. 9, and the up-counting from zero to the value of the data read out from ROM 21, as in FIG. 5, are equivalent to each other so that flip-flop 71S in FIG. 9 will produce the same pulse-width modulation signal $P_{WS}$ as the flip-flop 71S in FIG. 5. Of course, FIG. 9 shows only the arrangement provided for the so-called sine phase, and a similar arrangement will be provided for the so-called cosine phase and will similarly include a counter corresponding to the illustrated counter 73S and a zero-detecting circuit corresponding to the circuit 79S of FIG. 9. Furthermore, apart from the changes in the means by which the flip-flops 71S and 71C are reset to determine the pulse widths of the pulse-width modulation signals $P_{WS}$ and $P_{WC}$, the embodiment of FIG. 9 may be otherwise the same as, and include all of the previously described features of the embodiment of FIG. 5.

In a modification of the embodiment described above with reference to FIG. 9, the complements of 1 (one) of the digital information data read out from ROMs 21 and 31 are respectively preset into the counter 73S and the corresponding counter for the cosine phase which, in this case, are operative to up-count the output of oscillator 72, and, when all bits of the counter's output become "1", the respective flip-flop 71S or 71C is reset.

It will be appreciated that, in all of the previously described embodiments of the invention, the sinusoidal information data stored in the ROMs 21 and 31 are free of distortion and are read out therefrom by the signal $P_{FG}$ synchronized with the rotation of the rotor in synchronism with the magnetic flux densities from the rotor magnet 2 as detected by the Hall-effect element 6, with the read-out information data being used to produce the currents flowing through the stator windings 4 and 5. By reason of the foregoing, such drive circuits for brushless DC motors according to this invention avoid the torque ripple that may be encountered in the prior art by reason of a difference between the gain or sensitivity of two Hall-effect elements used for detecting the rotor magnet field and/or by reason of a DC offset voltage. Further, even though the magnetic field of the rotor magnet 2 may not be precisely sinusoidal, the currents flowing through stator windings 4 and 5 of a motor having a drive circuit according to this invention will not be affected thereby.

More specifically, it will be noted that, in each drive circuit for a brushless DC motor according to this invention, the digital information data read out from the memory, that is, from ROMs 21 and 31, are not converted into corresponding analog signals, but rather are processed in a digital manner to control the pulse widths of pulse-width modulation signals determining the currents flowing through the stator windings. Therefore, after reading out the digital information data from the memory, there is no place in the drive circuit where a DC offset voltage or the like may be generated, so that constant rotation of the rotor can be effected without torque ripple.

It will also be appreciated that, since the stator windings are driven by current pulses in the normal rotating state, the last stages of the drive circuit, as at 80 and 90, can be powered by a single voltage source, which is advantageous in the case where a battery is used as the voltage source, as in a portable apparatus.

It is also to be noted that, in the illustrated embodiments of the invention, the repetitive frequency of the pulse-width modulation signals $P_{WS}$ and $P_{WC}$ is determined by the output $P_1$ of oscillator 76 which is selected to be outside the audio frequency band so that the problem of noise generation does not arise as a result of the motor drive circuit, for example, in a record or tape player. Such avoidance of noise generation would not be realized, if, for example, the pulse $P_{FG}$, rather than the output $P_1$ of oscillator 76, was employed for determining the repetitive frequency of the pulse-width modulation signals. In other words, if, for example, the flip-flop 71S was set by the pulse $P_{FG}$ and reset by the output of the digital comparator 74S (FIG. 5) or the output of the zero detector 79S (FIG. 9), the repetitive frequency of the resulting pulse-width modulation signal $P_{WS}$ would be equal to the frequency of the pulse $P_{FG}$. In that case, if the brushless DC motor is used for driving the turntable of a phonograph record player and the frequency generator 41 is designed to provide 512 pulses for each revolution of the rotor, and hence of the turntable, then the frequency of the pulse $P_{FG}$ will be approximately 300 Hz for a turntable speed of $33\frac{1}{3}$ rpm. In such case, the repetitive frequency of each of the pulse-width modulation signals is within the audio frequency band, and the driving of the turntable by pulses of such frequency can result in undesirable noies generation. However, as previously noted, in accordance with this invention, the signal $P_1$ from oscillator 76 determines the repetitive frequency of the pulse-width modulation signals and is selected to be well outside the audio frequency band or range so that the mentioned noise generation cannot occur. It is further to be noted, by way of summary that, in drive circuits for brushless DC motors according to the described embodiments of this invention, the servo signal SVO can be used for controlling the frequency of the variable frequency oscillator 72 for changing the pulse widths of the pulses-width modulation signals, and also controlling the frequency of the variable frequency oscillator 76 for determining the repetitive frequency of the pulse-width modulation signals, so that a relatively high servo gain is achieved and the velocity servo control has an improved response characteristic In the illustrated embodiments of the invention, the currents flowing through the stator windings 4 and 5 have been synchronized with the magnetic field of the rotor magnet 2 by means of the Hall-effect element 6 which detects such magnetic field. However, it is to be noted that a similar synchronization can be achieved, for example, by providing an additional permanent magnet attached at a predetermined position on the rotor yoke 3 to act as a rotational marker, and by detecting the position of such additional magnet, for example, by means of a Hall-effect element, whose output is employed similarly to the output $E_S$ from element 6 for achieving the desired synchronization.

In the illustrated pulse-drive circuits 80 and 90 associated with stator windings 4 and 5, respectively, different current paths, as at $A_0$ and $A_1$, and as at $B_0$ and $B_1$, are provided for changing the directions of the currents flowing through the stator windings. However, in a drive circuit for a brushless DC motor according to this invention, changes in the directions of the currents flowing through the stator windings may be effected by reversing the connections to the ends of the windings, that is, by reversing the starting and finishing ends of the windings.

Although illustrative embodiments and various modifications thereof have been described in detail herein, it is to be understood that the invention is not limited to those precise embodiments and specifically mentioned modifications, and that further changes and modifications may be effected therein by one skilled in the art without departing from the scope or spirit of this invention as defined in the appended claims.

What is claimed is:

1. In a brushless DC motor comprising a rotor having an axis of rotation and including rotor magnet means establishing a sinusoidal magnetic field along a circular line concentric with said axis, and a stator including two-phase stator windings spaced from each other by an electrical angle which is an odd multiple of 90°, said rotor and stator being mounted for relative rotation about said axis with said stator windings confronting said rotor magnet means across said line so as to be affected by said sinusoidal magnetic field;

a drive circuit including signal generating means providing an output with a frequency determined by the speed of said relative rotation, memory means for storing information data representing respective sampled values of predetermined sinusoidal waveforms, means responsive to said output of the signal generating means for reading out said information data from said memory means, means for synchronizing said reading out of the information data with the affect of said sinusoidal magnetic field on said stator windings, means for providing electrical currents through said stator windings which co-act with said magnetic field to produce torque for effecting said relative rotation, and means responsive to said information data read out of the memory means for controlling said electrical currents so as to substantially eliminate ripple from said torque.

2. A brushless DC motor according to claim 1; in which said information data is stored in digital form in said memory means at addresses corresponding to the portions along said waveforms at which the respective sampled values are taken; and in which said means for reading out the information data includes means for generating pulses in accordance with said output of the signal generating means, and counting means for counting said pulses and providing counted outputs which nominate said addresses in sequence for the reading out of said information data therefrom.

3. A brushless DC motor according to claim 2; in which said means for synchronizing said reading out of the information data includes means responsive to said sinusoidal magnetic field for generating a resetting signal to reset said counting means whenever said magnetic field established by said rotor magnet is in a predetermined rotational position in respect to said stator windings.

4. A brushless DC motor according to claim 3; in which said means for generating a resetting signal includes a Hall-effect element fixed relative to said stator windings to provide an output in response to said sinusoidal magnetic field, and flip-flop means responsive to said output of said Hall-effect element to provide said resetting signal in said predetermined rotational position.

5. A brushless DC motor according to claim 1; in which said means for providing electrical currents through said stator windings includes means for reversing the directions of said currents through said stator windings at each change-over between positive and negative half-cycles of said sinusoidal magnetic field as applied to the respective stator windings.

6. A brushless DC motor according to claim 5; in which said information data is stored in digital form in said memory means at addresses corresponding to positions along half-cycles of said waveforms at which the respective sampled values are taken; said means for reading out the information data includes means responsive to said output of the signal generating means for producing pulses at a rate corresponding to that at which said addresses are to be successively nominated, and counting means for counting said pulses to provide counted outputs which nominate said addresses in sequence for the reading out of said information data therefrom and for emitting change-over pulses when the values of said counted outputs correspond to addresses in said memory means at which are stored sampled values taken at zero-cross points of the respective waveforms; and said means for reversing the directions of said currents includes switch means having first and second states corresponding to first and second directions of said currents, and means changing-over said switch means between said first and second states in response to said change-over pulses.

7. A brushless DC motor according to claim 6; in which said odd multiple is one so that said electrical angle is 90°; said memory means includes first and second memory units having equal numbers of addresses with the information data stored in corresponding addresses of said first and second memory units corresponding to positions which are 90° apart in phase along the respective half-cycles of the waveforms; and
  in which said counting means includes first and second counters each counting said pulses and having respective counted outputs for nominating said addresses of the first and second memory units, respectively, said first counter emitting a carry pulse as said change-over pulse when said counted output of the first counter attains its maximum value, and said second counter emitting the respective one of said change-over pulses when said counted output is half of said maximum value.

8. A brushless DC motor according to claim 7; in which said means for controlling the electrical currents includes a first oscillator having an output with an oscillation frequency higher than said frequency of the signal generating means, a second oscillator having an output with an oscillation frequency substantially higher than said oscillation frequency of said first oscillator, oscillation counting means for counting said output of the second oscillator and being reset by said output of the first oscillator, first and second flip-flops each set by said output of the first oscillator, and means for resetting said first and second flip-flops when said output of the second oscillator is counted by said oscillation counting means to numbers determined by the information data read out of said first and second memory units, respectively, so that said first and second flip-flops provide first and second pulse-width modulation signals of repetition frequencies determined by said first oscillator, said first and second pulse-width modulation signals being applied through said switch means to said means for providing electrical currents for controlling the latter as supplied to said two-phase stator windings, respectively.

9. A brushless DC motor according to claim 8; in which each of said first and second oscillators is a variable frequency oscillator; and further comprising servo means responsive to deviations of said speed of relative rotation from a predetermined value for differentially varying the oscillation frequencies of said first and second oscillators.

10. A brushless DC motor according to claim 8; in which said means for resetting said first and second flip-flops includes first and second digital comparators each receiving the counted output of said oscillation counting means, said first digital comparator comparing said counted output of the oscillation counting means with the information data read out of said first memory unit and, upon coincidence thereof, applying a resetting signal to said first flip-flop, and said second digital comparator comparing said counted output of the oscillation counting means with the information data read out of said second memory unit and, upon coincidence thereof, applying a resetting signal to said second flip-flop.

11. A brushless DC motor according to claim 8; in which said oscillation counting means includes first and second down-counters having the information data read out of said first and second memory units respectively set therein and down-counting said output of the second oscillator from said information data set in the first and second down-counters; and said means for resetting said first and second flip-flops includes first and second zero-detectors applying resetting signals to said first and second flip-flops when said first and second down-counters count down to zero from said information data respectively set therein.

12. A brushless DC motor according to claim 1; in which said means for controlling the electrical currents includes a first oscillator having an output with an oscillation frequency higher than said frequency of the signal generating means, a second oscillator having an output with an oscillation frequency substantially higher than said oscillation frequency of said first oscillator, counting means counting said output of the second oscillator and being reset by said output of the first oscillator, flip-flop means set by said output of the first oscillator, and means for resetting said flip-flop means when said output of the second oscillator is counted by said counting means to a number determined by the information data read out of said memory means so that said flip-flop means provides pulse-width modulation signals of a repetitive frequency determined by said first oscillator; and in which said means for providing electrical currents includes pulse drive circuit means controllable by said pulse-width modulation signals.

13. A brushless DC motor according to claim 12; in which each of said first and second oscillators is a variable frequency oscillator; and further comprising servo means responsive to deviations of said speed of relative rotation from a predetermined value for differentially varying the oscillation frequencies of said first and second oscillators.

14. A brushless DC motor according to claim 12; in which said means for resetting said flip-flop means includes comparator means receiving the counted output of said counting means and comparing said counted output with the information data read out of said memory means and, upon coincidence thereof, applying a resetting signal to said flip-flop means.

15. A brushless DC motor according to claim 12; in which said counting means has the information data read out of said memory means set therein and operates to downcount said output of the second oscillator from said information data set in the counting means; and said means for resetting said flip-flop means includes zero-detector means applying a resetting signal to said flip-flop means when said counting means counts down to zero from said information data set therein.

16. In a brushless DC motor comprising a rotor having an axis of rotation and including rotor magnet means establishing a sinusoidal magnetic field along a circular line concentric with said axis, and a stator including two-phase stator windings spaced from each other by an electrical angle which is an odd multiple of 90°, said rotor and stator being mounted for relative rotation about said axis with said stator windings confronting said rotor magnet means across said line so as to be affected by said sinusoidal magnetic field;

a drive circuit including signal generating means providing an output with a frequency determined by the speed of said relative rotation, memory means for storing digital information data representing respective sampled values of predetermined sinusoidal waveforms, means responsive to said output of the signal generating means for reading out said information data from said memory means, means for synchronizing said reading out of the information data with the affect of said sinusoidal magnetic field on said stator windings, means for providing a pulse-width modulation signal comprised of a train of pulses having their widths modulated in accordance with said information data read out of the memory means, and means responsive to said pulse-width modulation signal for providing electrical currents through said stator windings which co-act with said magnetic field to produce torque for effecting said relative rotation.

17. A brushless DC motor according to claim 16; in which said digital information data is stored in said memory means at addresses corresponding to successive locations along said waveforms at which the respective sampled values are taken; and in which said means for reading out the information data includes means for generating pulses in accordance with said output of the signal generating means, and counting means for counting said pulses and providing counted outputs which nominate said addresses in sequence for the reading out of said information data therefrom.

18. A brushless DC motor according to claim 17: in which said means for synchronizing said reading out of the information data includes means responsive to said sinusoidal magnetic field for generating a resetting signal to reset said counting means whenever said magnetic field established by said rotor magnet is in a predetermined rotational position in respect to said stator windings.

19. A brushless DC motor according to claim 18; in which said means for generating a resetting signal includes a Hall-effect element fixed relative to said stator windings to provide an output in response to said sinusoidal magnetic field, and flip-flop means responsive to said output of said Hall-effect element to provide said resetting signal in said predetermined rotational position.

20. A brushless DC motor according to claim 16; in which said means for providing electrical currents through said stator windings includes means for reversing the directions of said currents through said stator windings at each change-over between positive and negative half-cycles of said sinusoidal magnetic field as applied to the respective stator windings.

21. A brushless DC motor according to claim 20; in which said digital information data is stored in said memory means at addresses corresponding to successive locations along half-cycles of said waveforms at which the respective sampled values are taken; said means for reading out the information data includes means responsive to said output of the signal generating means for producing pulses at a rate corresponding to that at which said addresses are to be successively nominated, and counting means for counting said pulses to provide counted outputs which nominate said addresses in sequence for the reading out of said information data therefrom and for emitting changeover pulses when the values of said counted outputs correspond to addresses in said memory means at which are stored sampled values taken at zero-cross points of the respective waveforms; and said means for reversing the directions of said currents includes switch means having first and second states corresponding to first and second directions of said currents, and means changing-over said switch means between said first and second states in response to said change-over pulses.

22. A brushless DC motor according to claim 21; in which said odd multiple is one so that said electrical angel is 90°; said memory means includes first and second memory units having equal numbers of addresses with the information data stored in corresponding addresses of said first and second memory units relating to locations which are 90° apart in phase along the respective half-cycles of the waveforms; and in which said counting means includes first and second counters each counting said pulses and having respective counted outputs for nominating said addresses of the first and second memory units, respectively, said first counter emitting a carry pulse as said change-over pulse when said counted output of the first counter attains its maximum value, and said second counter emitting the respective one of said change-over pulses when said counted output is half of said maximum value.

23. A brushless DC motor according to claim 16; in which said means for providing a pulse-width modulation signal includes a first oscillator having an output with an oscillation frequency higher than said frequency of the signal generating means, a second oscillator having an output with an oscillation frequency substantially higher than said oscillation frequency of said first oscillator, counting means counting said output of the second oscillator and being reset by said output of the first oscillator, flip-flop means set by said output of the first oscillator, and means for resetting said flip-flop means when said output of the second oscillator is counted by said counting means to a number determined by the information data read out of said memory means so that said flip-flop means provides said pulse-width modulation signal with a repetitive frequency determined by said first oscillator; and in which said means for providing electrical currents includes pulse drive circuit means controllable by said pulse-width modulation signal.

24. A brushless DC motor according to claim 23; in which each of said first and second oscillators is a variable frequency oscillator; and further comprising servo means responsive to deviations of said speed of relative rotation from a predetermined value for differentially varying the oscillation frequencies of said first and second oscillators.

25. A brushless DC motor according to claim 23; in which said means for resetting said flip-flop means includes comparator means receiving the counted output of said counting means and comparing said counted output with the information data read out of said memory means and, upon coincidence thereof, applying a resetting signal to said flip-flop means.

26. A brushless DC motor according to claim 23; in which said counting means has the information data read out of said memory means set therein and operates to down-count said output of the second oscillator from said information data set in the counting means; and said means for resetting said flip-flop means includes zero-detector means applying a resetting signal to said flip-flop means when said counting means counts down to zero from said information data set therein.

27. A brushless DC motor according to claim 20; further comprising means operative upon the commencement of operation of the motor for inhibiting the production of said pulse-width modulation signal and for replacing the latter with a constant signal which, in said means for providing electrical currents, causes substantially constant currents to flow through said stator windings alternately in said directions which are reversed.

28. A brushless DC motor according to claim 27; further comprising means operative to restore the production of said pulse-width modulation signal when said speed of the relative rotation attains a predetermined value and said sinusoidal magnetic field is in a predetermined position in respect to said stator windings.

29. A brushless DC motor according to claim 20; further comprising means operative in response to said output of the signal generating means when said speed of the relative rotation is decreased below a predetermined value to inhibit the production of said pulse-width modulation signal and to replace the latter with a constant signal which, in said means for providing electrical currents, causes substantially constant currents to flow through said stator windings alternately in said directions which are reversed; and means operative to restore the production of said pulse-width modulation signal when said speed of the relative rotation again exceeds said predetermined value and said sinusoidal magnetic field is in a predetermined position in respect to said stator windings.

* * * * *